United States Patent [19]

Pettigrew et al.

[11] Patent Number: 4,522,482

[45] Date of Patent: Jun. 11, 1985

[54] INFORMATION STORAGE AND RETRIEVAL

[75] Inventors: Robert M. Pettigrew, Foxton; John D. Bradbrook; Alan M. Smith, both of Royston; John H. Fisher, Whaddon, all of England

[73] Assignee: Comtech Research, United Kingdom

[21] Appl. No.: 467,479

[22] PCT Filed: Jun. 15, 1982

[86] PCT No.: PCT/GB82/00179

§ 371 Date: Feb. 14, 1983

§ 102(e) Date: Feb. 14, 1983

[87] PCT Pub. No.: WO82/04489

PCT Pub. Date: Dec. 23, 1982

[30] Foreign Application Priority Data

Jun. 15, 1981 [GB] United Kingdom ............... 8118329
Jul. 23, 1981 [GB] United Kingdom ............... 8122737
Jun. 1, 1982 [GB] United Kingdom ............... 8215982

[51] Int. Cl.³ .............................................. G03G 15/00
[52] U.S. Cl. ..................................... 355/3 R; 355/5; 355/7; 364/518
[58] Field of Search ............... 355/3 R, 7, 14 R, 53, 355/72, 86, 95, 77, 5; 430/31; 364/518

[56] References Cited

U.S. PATENT DOCUMENTS 3,972,610 8/1976 Gross ..................................... 355/7
4,179,743 12/1979 Suzuki et al. ..................... 364/518

OTHER PUBLICATIONS

Journal of Optics, vol. 11, No. 1, Jan./Feb. 1980, (Paris, FR), "System d'Impression à Laser", p. 10.

Primary Examiner—R. L. Moses
Attorney, Agent, or Firm—Poms, Smith, Lande & Rose

[57] ABSTRACT

An apparatus for recording information in the form of a two dimensional array of miniature images on a recording material such as electrophotographic, photographic or photochromic material. Means are included for forming those images (by such of the processes of sensitizing, charging, exposing, developing or fixing as are appropriate to the particular material used) from originals or copies of legible size. A facility is provided to form one or more miniature images occupying only part of a storage member on one occasion, and to record a further such image or images on later occasions. Guide means and propulsion means in two dimensions are included for adjusting the relative positions of the storage member and the image forming or image viewing device so that any image space may be presented to the image forming device and any image may be presented to an image viewing device. Two dimensional measuring means are also included which provide information to a control system of the propulsion means so that it can present any chosen image space or image, defined by two numbers which are coordinates, to the image forming device or the image viewing device.

60 Claims, 13 Drawing Figures

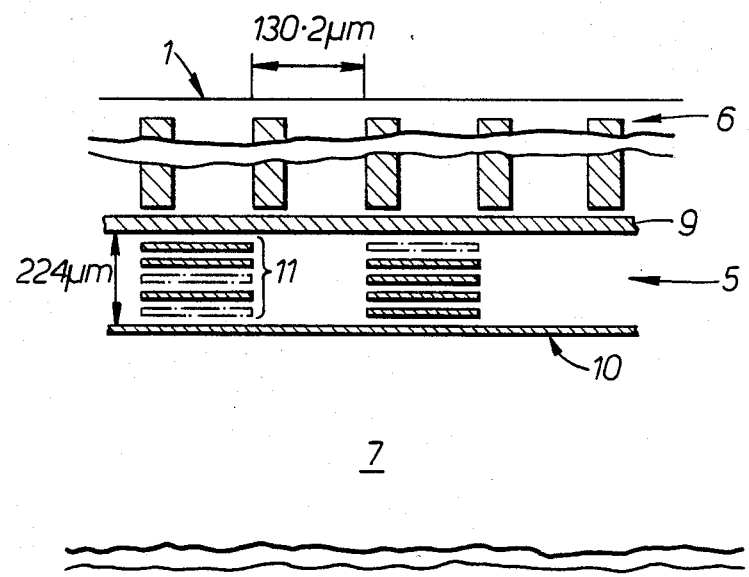
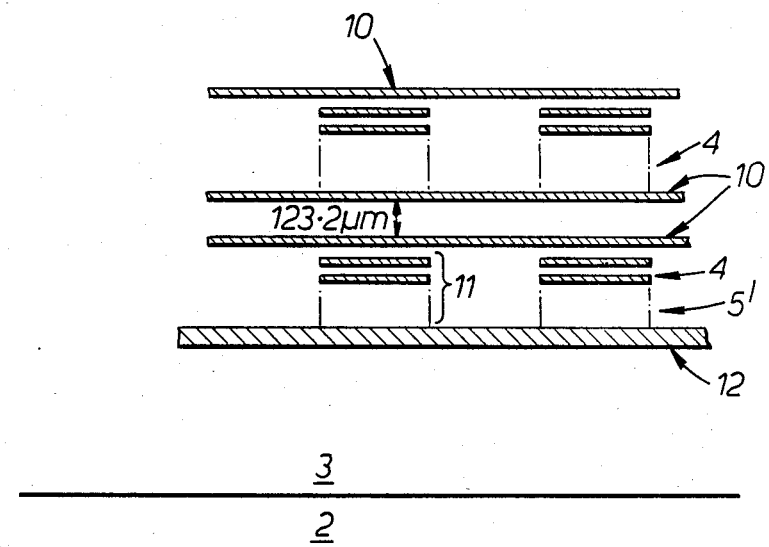
FIG. 2.

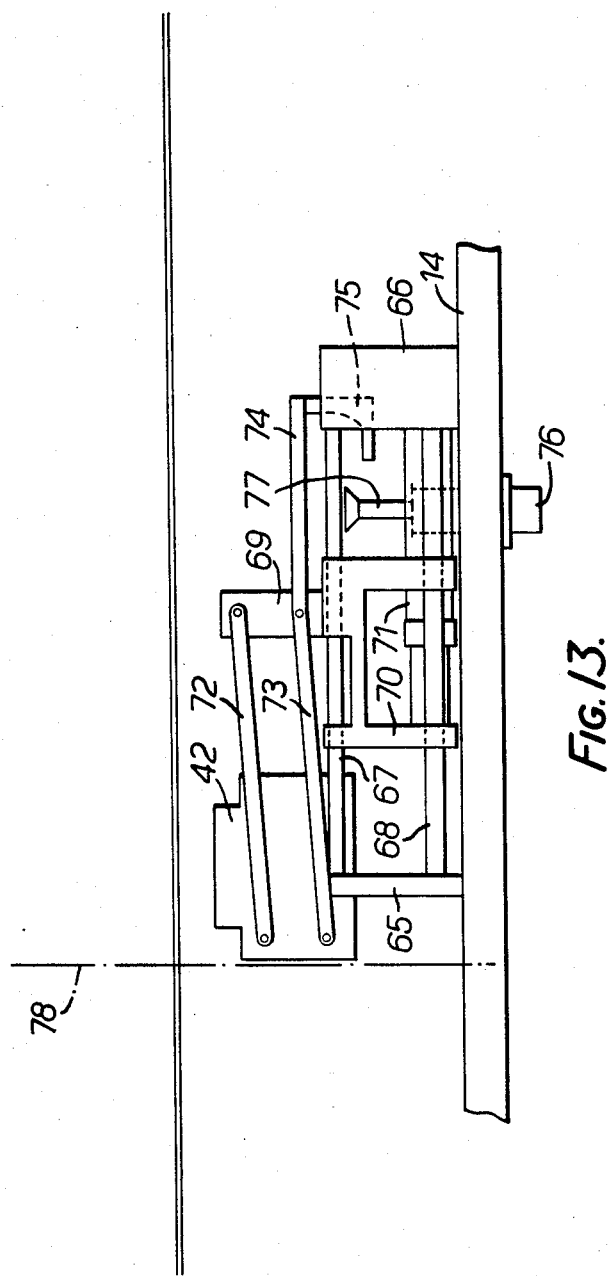

INFORMATION STORAGE AND RETRIEVAL

This invention relates to information storage and retrieval involving optical storage.

In an information storage system, it is a common requirement to input a quantity of information less than the total capacity of the system, to index that information for easy retrieval and to refer to that information (i.e. to use it) using the index. At a later date more information may be input and the process repeated until the storage capacity of the system is full or nearly full. It may then be possible to extend the storage capacity. This type of use is exemplified by a conventional filing cabinet in which documents may be placed and indexed in such a manner that they can be found easily, and in which more documents can be added as they come to hand.

Because of the bulk of large quantities of paper, it is now common to store information in various forms more compact than the original characters or graphical representations on paper. Common forms of high density information are small-scale reproductions of the original, encoded forms of the original such as video (television-type) encoding and digital representations of the characters constituting the original.

Two different optical storage systems have hitherto found commercial acceptance, one employing microfilm and the other employing optical laser storage methods.

In microfilm systems, high capacity optical data storage is effected photographically on light-sensitive microfilms, such as microfiche. Capacities of up to ten million bits/mm$^2$ have been achieved, the maximum being limited by the quality of the photographic emulsions available. The production of microfilms for a very high capacity system is therefore very expensive. Microfiche is one type of microfilm system which involves reproducing a large number of pages of information on a single sheet which can be searched manually in two dimensions. Such a microfiche system is disclosed in U.S. Pat. No. 4,179,743. In addition to storing pages, the system stores adjacent each page a marker related to the content of the page. That system is therefore applicable only to storing information which is intrinsically ordered or self-indexed (in the manner of a dictionary).

Optical laser storage systems using discs have been made wherein information is stored in the form of a coded series of pits in concentric rings, or in spirals, on the surface of a transparent disc. The information is read using a source of coherent laser illumination focussed on each of the pits in turn as the disc is rotated. The spot size of the illumination must be less than or comparable to the area of a single pit. The light diffracted by the pits, either on reflection or in transmission, is monitored and is used to reconstruct electronically an image of the stored information. In this case the information is necessarily encoded and so is not directly readable, requiring the use of electronic decoders to convert the stored information into signals suitable for a video display unit.

A disc system has been proposed with which it is possible to image optical information without the use of laser light and somewhat in the manner of microfilm or microfiche. Such a system is disclosed in British Patent Specification No. 1091981 and comprises the use of a disc having a spiral groove and, between the turns of the groove, a flat spiral land having a coating of photographic emulsion constituting a video track. A reading head is employed which has a pick-up which physically engages the groove for the purpose of accurately locating the reading head relative to the video track. Video data is recorded on the track so that a flying spot scanner can scan picture elements in a linear fashion.

An object of the present invention is to provide an optical information recording arrangement which permits information to be recorded in relation to an absolute position measuring system, enabling items of information to be recovered readily by a control system utilising that measuring system.

An object of preferred embodiments of the present invention is to provide an optical information recording arrangement which permits information to be recorded in an interrupted fashion, i.e. so that the information holding member can be used between successive recording operations.

According to one aspect of the present invention, there is provided a recording apparatus for recording optically readable images on a storage member comprising recording material by means of which such images can be recorded on the member, the apparatus comprising processing means for recording said images on the storage member the processing means having imaging means for imaging data to be recorded onto the storage member, and the apparatus also comprising drive means for producing relative motion between the imaging means and the storage member so that an image can be directed at a desired location of the storage member, characterised in that there are control means for controlling the drive means to enable an image to be recorded at any desired one of a plurality of areas of a two-dimensional array of areas in a first zone of the storage member, the control means comprising for reading positional information conveyed by the storage member in a second zone to ascertain a datum position for a first co-ordinate and a second co-ordinate of a two-dimensional co-ordinate system in which each of said areas has its own two-dimensional address.

According to a second aspect of the invention there is provided a storage member comprising recording material by means of which optically readable images can be recorded and stored by the member, characterised in that the member comprises a first zone at which said recording material is provided and, distinct from the first zone, means which provide a machine readable datum for a first co-ordinate and for a second co-ordinate of a two co-ordinate system providing addressing means for each of a plurality of areas of the first zone.

In a preferred embodiment, the storage member has a second zone or zones distinct from said first zone and carrying pre-recorded absolute address data in one of the co-ordinate directions. Position in the second co-ordinate direction may be provided by a pre-recorded position element or elements pre-recorded in a zone also distinct from said first zone. The zone which comprises the information recording areas may be photographically, electrophotographically or photochromically sensitive and appropriate image developing and/or fixing means will be provided according to the type of zone involved.

The apparatus may also function as a reading apparatus for reading recorded images in the information recording areas, for example in accordance with European Patent Application No. 81300321.7.

Possible embodiments of the invention will now be described.

These embodiments employ a storage member which comprises a plurality of information recording areas at each of which an optically readable analogue image can be retained by at least the step of directing an optical analogue image onto that area. For this purpose, material at said areas may be electrophotographic, photographic or photochromic.

Each area can have a distinct image retained at it so that, preferably, the information is held in the form of individual pages in respective areas. The areas can be processed at different times so that a two-dimensional area of miniature images can be built up by the user over a length of time.

Information is preferably recorded on the storage member in the form of reduced images by electrophotography. The individual pages, images or areas can, for example, be arranged in concentric rings or in a circular spiral. Alternatively, the individual pages of information can be arranged in zones having other geometrical forms.

Information is preferably recorded on the optical storage member in the form of reduced images formed by electrophotography. The individual pages, images or areas can, for example, be arranged in concentric rings or in a circular spiral. Alternatively, the individual pages of information can be arranged in zones having other geometrical forms.

Any one of several electrophotographic systems may be used to effect the recording of information. The following are given by way of example.

1. TEP (transparent electrophotographic material). For this method, the substrate consists of a thin sheet of a moderately rigid material (for example polyethylene terephthalate which may be about 60 microns thick). The exact thickness and choice of material for the substrate are not critical. The substrate carries a very thin layer of an electrically conducting material. In some embodiments, this conducting layer is sufficiently thin to be optically transparent. Another layer, overlying the conducting layer, is a thin layer of a photoconductive material. This layer, which may be about 10 microns in thickness, can be an organic photoconductive material, for example polyvinyl chloride incorporating a small proportion of a dye coupling compound. Commercially available materials of this sort are Kodak (Registered Trade Mark) materials S0101 and S0102. Alternatively, the photoconductive layer may be an inorganic photoconductive material such as cadmium sulphide. In order to form an image on TEP material, an electrical charge is first applied to the surface of the material. For the Kodak materials mentioned above, a positive charge is applied by means of a Corotron so as to raise the surface potential of the material to a value in the range 500 to 800 volts with respect to the conductive layer (which may be earthed). A convenient method of uniformly charging a sector of the surface is to rotate the surface at uniform speed, adjacent to a linear Corotron which is arranged radially with respect to the optical storage disc. The Corotron then delivers a distributed charging current to the surface, the magnitude of which current is proportional to the radius where the Corotron is located. After the surface has been charged, an optical image is projected by a suitable optical system onto that part of the surface on which a page or pages are to be recorded. When the surface is illuminated by parts of the projected image, at least part of the surface charge leaks away. Where the surface is not illuminated, most of the surface charge remains.

Toner is then applied to the area where the image has been projected. The toner can conveniently consist of very fine black powder in suspension in an electrically insulating fluid, for example a paraffin or mixture of paraffins. Depending upon the nature of the black powder selected, it may either adhere to the regions where most charge remains or to the regions which are most nearly discharged, thus giving either a positive or a negative image. Excess toner over and above that adhering to the electronic image is then removed and the image area is heated to fuse the tones into a mass which is strongly adherent to the photoconductive layer.

2. Migration imaging. The material for forming a migration image comprises a substrate, which may be polyethylene terephthalate and which can conveniently be 50 microns thick. Superimposed on the substrate is a very thin layer of an electrically conducting material. This layer can be sufficiently dense for the material to be optically transparent. Located above the tin conducting layer there is a thicker layer of an insulating thermoplastic material. Particles of an opaque photoconductive material are located within this layer, and can be, for example, located as a mono-layer just beneath the upper surface of the thermoplastic material. With this arrangement, the mono-layer is continuous and substantially optically opaque. Typically it may transmit no more than 1% of incident light. In order to form an image in such material, an electrical charge is deposited on the surface of the material in a manner similar to that described above for the TEP material. An optical image is then projected onto that part of the surface where a page or pages of information are to be recorded. In the bright parts of the image, the photoconductive particles become conducting and take up charge from the thermoplastic material. After exposure, the thermoplastic layer is heated until is softens sufficiently to allow the particles a limited mobility. In this condition, the charged particles move by electrostatic attraction towards the earthed conducting layer against the viscous resistance of the thermoplastic material. After this migration, the thermoplastic layer is allowed to cool, thus freezing the particles in position. This process causes disruption of the mono-layer into a three-dimensional dispersion of particles the form of which corresponds to the bright and dark areas of the illuminated image. The dispersion of particles permits the passage of a proportion of incident light, the maximum being transmitted when the particles are distributed throughout the entire thickness of the layer. With this migration imaging technique, the heating step must not be too long, since this would permit reforming of an opaque mono-layer on the conducting layer, and would thus reduce the contrast of the image.

The above image forming methods are not intended to be exhaustive, and the present invention can operate with other image-forming techniques.

Returning now to general aspects of preferred embodiments, it is pointed out that, prior to use, said information storage areas of the storage member need not be distinct preselected areas but could be indistinguishable portions of a recording zone at substantially any point at which an image may be recorded. The location of individual pages or areas is then determined, during recording or later retrieval, by measuring means of the recording or retrieval apparatus. For this purpose, the storage member has recorded on it at least one machine detectable datum defining a datum for one co-ordinate direction and a datum for a second co-ordinate direction of a two-co-ordinate measuring system by which the location of each area or page can be defined by measuring means. A datum may be, for example a detectable track extending in the intended direction of the first co-ordinate, thus providing a datum or "zero" position for the second co-ordinate direction. Such a track thus defines the direction of one co-ordinate and the datum for the other. A datum may be provided at, or separate from, such a track to define the datum or "zero" for the first co-ordinate direction. All control data, such as a co-ordinate datum, are in zones of the storage member distinct from the zone or zones containing the information storage areas. In a preferred embodiment, there may be a control data zone containing absolute address data in one of the co-ordinate directions. Moreover position data may be provided to define a dimension of the storage member for use in monitoring that dimension of the member, e.g. to compensate for thermal dimensional changes of the storage member.

However the datum is provided, two-dimensional measuring means are provided in the system to provide information by which any chosen area, defined by a two-co-ordinate address, can be presented to image forming means for recording, or to image viewing means for retrieval.

Coming now to the preferred form of apparatus for recording information on the storage member, it comprises a support carrying image forming means (and possibly image viewing means) and drive means for producing relative motion in the two co-ordinate directions between the storage member and the image forming means (and any image viewing means provided).

In one embodiment, first drive means are provided to rotate the storage member relative to the support and second drive means are provided to drive the storage means relative to the image forming means in a direction passing through the axis of rotation of the storage member. In an alternative embodiment, the second drive means displaces the image forming means radially of the storage member.

The above-mentioned measuring means may measure the displacement produced by the two drive means independently of the storage member to obtain actual value positional information relative to the datum of each co-ordinate direction. However, in a preferred embodiment only the displacement produced by one drive means is measured in this way, e.g. the second drive means. In that case, the measuring means for the other dimension employs means for reading positional information provided on the storage member itself in respect of that other dimension, e.g. the angular co-ordinate for the situation in which the storage member is rotated in use.

Nevertheless, there may be positional information for each dimension provided on the storage member, so that the latter fully defines its own co-ordinate system and addresses, this providing more accuracy than measuring displacements separately from the storage member. However, more information storage areas are available if, in at least one dimension, the positional information, other than the datum, is not provided by the storage member itself.

The apparatus of preferred embodiments also has means for writing digital data on the storage member, preferably optically and preferably by the same storage methods as for the analogue information. These means may be additional to the image forming means to take into account the fact that individual digital images may occupy an area which is significantly smaller than that occupied by an analogue page. Nevertheless these additional means may include elements of the image forming means. Means may also be provided to read digital data carried by the storage member and to convert that data into a form suitable for input to digital computing means.

Digital data is preferably grouped on the storage member in a zone or zones distinct from the zone or zones containing the information storage areas. Preferably such a zone or zones containing digital data is provided by a track or tracks extending in one co-ordinate direction of the storage member.

In the case in which digital data is stored, means may be provided to enable a user to supply a name, or code representing names, from which the apparatus ascertains the corresponding address from the digital information contained in the storage member and then causes the appropriate area to be presented to image viewing means.

Preferred embodiments also include means to determine to co-ordinates of an area or areas defined by a logical combination of names, or codes, or classes of information.

With regard to the accuracy of locating specific areas of a storage member for recording and retrieving information, analogue or digital, it will be apparent there is a co-ordinate system implicit in the storage member and a co-ordinate system implicit in the drive means producing the necessary relative motions (and the measuring means if any, which, independently of the storage member, measure the displacements produced by the drive means). In theory, these co-ordinate systems will be identical, but three types of discrepancy may exist in practice:

(i) Position error, e.g. eccentricity when the co-ordinate system is polar, and skew when the co-ordinate system is Cartesian;

(ii) Isotropic scale error, e.g. due to thermal expansion differences between the storage member and separate measuring means if provided;

(iii) Anisotropic scale error, e.g. due to anisotropic expansion, for example with a multilayered record member. This produces a second harmonic error in angle in a polar co-ordinate system and an orthogonality error in a Cartesian system.

All these errors are readily determined by measuring the apparent co-ordinates of a number of datum points of the storage member. Once the errors are determined a co-ordinate transformation can be applied to the expected co-ordinates of any position specified. In a preferred embodiment, at least discrepancy (i) is taken into account and in the case in which, in at least one dimension, displacements are measured separately from the storage member, discrepancy (ii) is also compensated for. Depending upon the nature of the storage member and the resolution required, discrepancy (iii) may additionally be taken into account.

Fluid pressure (aerostatic or hydrostatic) bearing means are included in preferred embodiments accurately to locate the part of the storage member in use relative to the image forming and/or viewing means. Adjustment of the bearing means is infinite over a certain range in the focussing direction relative to the image forming and/or viewing means. Such bearing means provide means for maintaining the storage member out of contact with its processing means whilst it is in use and additionally, when electrical charges are employed during image forming, such bearing means maintains the member out of contact with the elements to which it might otherwise electrically discharge.

According to a third aspect of the invention, there is provided a method of storing information on a disc, which comprises (a) sensitizing a predetermined zone of the disc so that it becomes sensitive to electromagnetic radiation in, or close to, the optical range of wavelengths; (b) focussing onto the said predetermined zone, or a part thereof, a reduced image of the information to be recorded; (c) developing and/or fixing the predetermined zone or said part thereof so as to hold the reduced image in reproducible form within or on the material constituting the predetermined area of said disc; and (d) providing positional address data on the disc in one or more areas separate from said predetermined zone to enable the information recorded at said zone to be retrieved. At least some elements of the address data may be pre-recorded on the disc before steps (a), (b) and (c) above are performed. In one embodiment, the disc has a first area or areas carrying pre-recorded absolute addresses in one co-ordinate direction and the predetermined zone or (zones) where information is to be recorded are located apart from said first area or areas. Address data in a second co-ordinate direction may be provided by a pre-recorded position element or elements pre-recorded in an area also distinct from said predetermined zone or zones. In another embodiment, address data is recorded on the disc in predetermined areas thereof after steps (a), (b) and (c) above have been carried out; with such an arrangement, it is possible to record a "page" of information in part of a predetermined zone of the disc, then to record address data relating to that page, and thereafter to record a further page of information in a second part of the said predetermined zone of the disc. The sequence of recording steps involved, and the location of successive pages of information stored in the predetermined zone or zones of the disc will be determined according to the arrangements adopted for holding address data.

In carrying out step (a) of the above method, the electromagnetic radiation involved will generally be in the visible range of wavelengths. The method of the invention may, however, be performed using near ultra-violet or near infra-red radiation instead of, or as well as, visible radiation. The material located at said predetermined zone and which, after recording, will hold an image of the information being stored, can be a transparent electrophotographic material or a migration imaging material as described hereinabove. Other forms of image-holding materials may be used.

The developing and/or fixing step in the above method will generally involve the application of a toner, which may be for example a liquid toner comprising an electrically insulating liquid having dispersed therein fine black powder particles. After application of the toner, excess toner material is removed and, at this stage, the predetermined zone of the disc carries a positive or negative reduced image of the original information focussed onto it. This image is then made permanent, for example by heating the predetermined zone of the disc so as to fuse the toner particles thereon.

Apparatus in accordance with the present invention will generally include a number of sub-assemblies such as, for example, a system for holding the information storage member precisely in place during the recording of an image, and a servo system for controlling relative movement between the optical storage member and the means for directing an image onto that member. These sub-assemblies may be constructed in accordance with the disclosure given in our European Patent Application No. 81300321.7.

For a better understanding of the invention and to show how the same may be carried into effect, reference will now be made, by way of example, to the accompanying drawings, in which:

FIG. 2 is a view of coded data on the member of FIG. 1;

FIG. 13 is a side elevation of a toner applicator and applicator moving equipment for use in the device of FIG. 3.

FIGS. 1 to 13 show an embodiment of an optical data storage system comprising optical data storage members in disc-form and an optical data recorder and reader.

FIG. 1 illustrates an example of an optical data storage member 1 in schematic plan.

Figure 1:
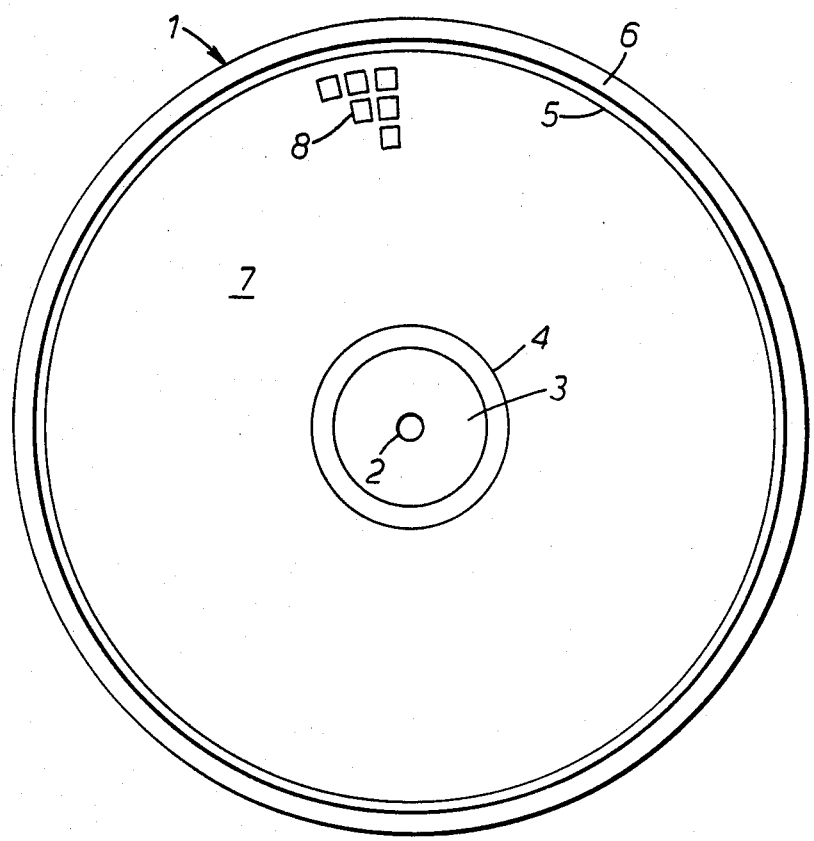
FIG. 1 is a schematic view in plan of a data storage member.

The member 1 is a circular disc of TEP material for example of about 30 cm diameter.

A hole 2 is provided in the central area 3 of the disc for locating the disc in the data recorder and reader. The illustrated example of disc is preformatted with optically readable tracks 4,5 and 6 of control data, tracks 5 and 6 being at the circumference, track or tracks 4 encircling the central area 3 and the track or tracks 4 being separated from tracks 5 and 6 by an area 7 which, prior to first use, contains no data or image and which is intended to have recorded in it optically displayable analogue information in substantially rectangular areas 8, each such area being referred to herein as a 'page' of information These pages 8 are arranged in concentric circles. In principle, any arrangement of the pages is possible such as spiral, square grid or even random, but an arrangement with concentric circles enables a simpler control system to be provided to locate individual pages.

The central area 3 is of about 5 cm radius and is left substantially free of data and circumferential tracks 5 and 6 carry analogue and/or digital coded page locating and control data. The control data is intended to be used by positional servos to provide page access. The form of this control data will be described later with reference to FIG. 2. The track or tracks 4 contain digital data or can have digital data recorded on them and will be described later.

FIG. 2 is a diagram of the control data tracks in developed form. Each 'bit' of data is hatched in this figure and is substantially opaque, the plain areas which are adjacent being light transmissive i.e. 'white'. The reverse is also possible, when the hatched areas are 'white'.

At the periphery of the disc is an incremental, angular position, track 6 consisting of a regular series of 'bits' at a spacing of 130.2 µm and with a width of 2 to 3 µm. A fixed moiré fringe transducer will continually monitor this track to provide a measure of the angular displacement of disc 1.

Next to track 6 in FIG. 2 is an absolute angular position track 5 (an alternative position 5' is shown just above area 3). This track comprises a pair of guard rails 9 and 10 between which are sets 11 of 'bits', each set being a radially extending 20 bit character comprising 16 data bits and 4 control bits, e.g. providing a check digit. Each set comprises hatched areas representing digital '1' and unhatched areas (shown dotted) representing digital '0'. There are 6000 sets, with one set aligned with each successive pair of bits in track 6. This track 5 therefore defines the absolute angular disc position every 260.4 µm. Circular rails or tracks 9 and 16 serve the purpose of defining the limits of the data and also enable disc eccentricity to be measured. During one complete revolution of the disc the rails can be scanned and at some or each set of bits 17 an eccentricity value can be measured and stored to provide eccentricity compensation during servo position control. Track 10 is about 5.6 µm wide but track 9 is much wider, e.g. 1 mm, in order that it should unambiguously be detected as its function is to provide a measure of eccentricity, a datum for a radial co-ordinate and, in conjunction with a wide band 12, to provide a preset radial distance measure.

One or more data tracks 4 are also provided and have the same digital structure as track 5.

It will be apparent that all these bits of FIG. 2 could be provided, for example, as magnetic or photographically produced markers to be read magnetically or optically respectively.

In a preferred embodiment, tracks 5 and 6, and all the rails or tracks 9, 10 and 12 are preformatted by contact printing for optical reading. A portion of digital data in track or tracks 4 may also be preformatted by contact printing or by digital writing techniques as described hereafter for track or tracks 4. Track or tracks 4 will be written with further digital data by a user.

In general terms, track 6 provides what may be termed as a co-ordinate scale which enables increments of movement to be measured, in this case annular increments. Another scale is provided in the recorder itself (to be described hereinafter) to provide a measure of radial increments of movement; these scales are described and shown as equally spaced graduations to be read optically, but magnetic or other suitable means known in the art of metrology are possible.

In addition to these scales there is provided an absolute datum for the incremental measurements. Thus, one of tracks or rails 9 and 12 provides an absolute datum for the radial measurements. The rails 9 and 12 together provide a fixed radial measurement by which radial measuring means may be calibrated. Moreover, track 5 provides an absolute datum for the annular measurement; in fact it provides 6000 alternative absolute data.

One form of a recorder, with a retrieval facility, will now be described in more detail with reference to the use of TEP as the recording material, i.e. a material comprising a transparent substrate carrying a transparent conductive layer on top of which is a transparent photoconductor. At the centre of the disc a small portion of the photoconductor is removed from the conductive layer to expose it and to enable an electrical connection to be made to it to a virtual earth.

Figure 3:
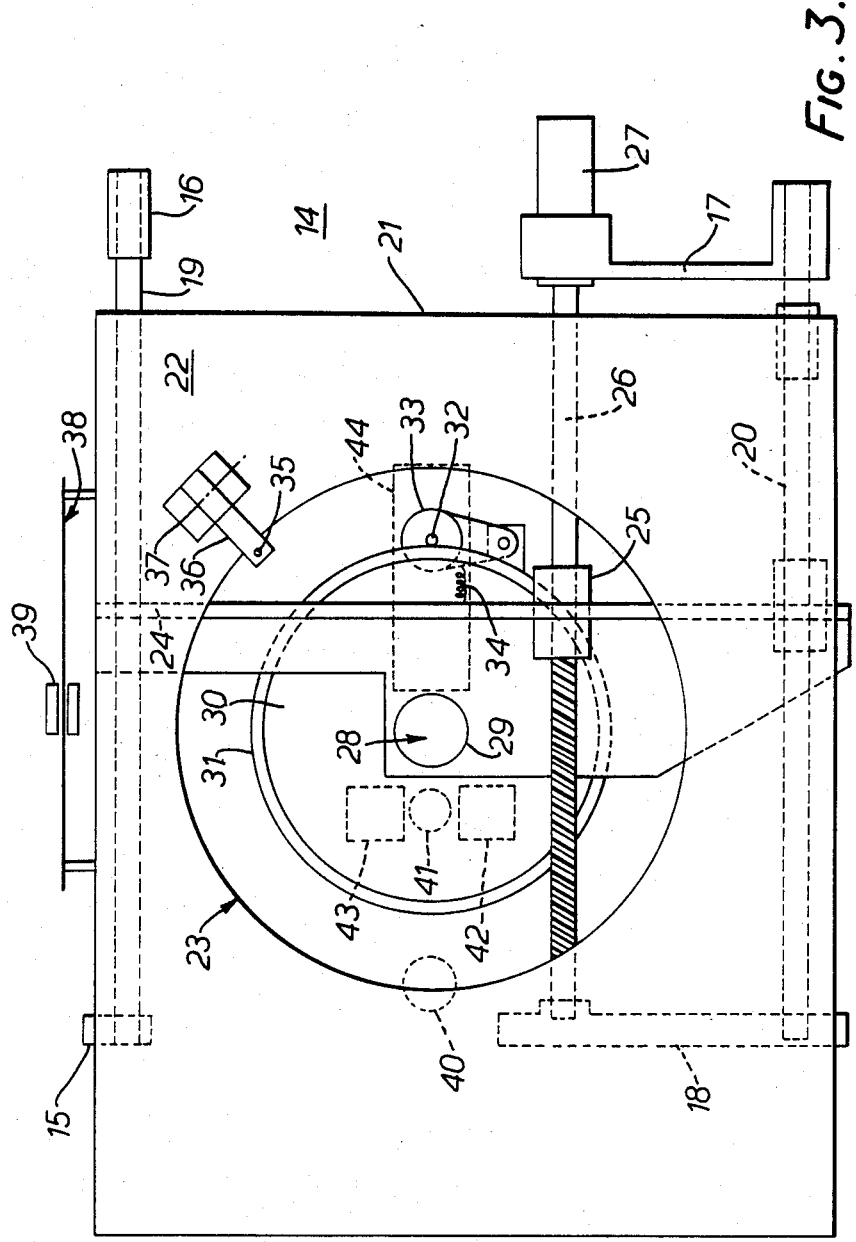
FIG. 3 is a plan view of a recording and retrieval apparatus.

Reference will now be made to FIG. 3 which is a plan view of the recorder with its optical system not shown for clarity.

The recorder comprises a base generally denoted 14 and which can be regarded as the general area of the paper in FIG. 3. Uprights 15, 16, 17 and 18 extend upwardly from the base and support two linear guide rails 19 and 20 which are in spaced-apart parallel relationship. On these guide rails is supported a carriage, generally denoted 21, which comprises a plate or tray 22 having an aperture 23 of a diameter slightly larger than that of a disc to be processed. The carriage includes a transverse wall 24 which supports the nut 25 of a lead screw and nut arrangement comprising a lead screw 26 rotatably mounted in the uprights 17 and 18 and driven by a controllable motor 27. The transverse wall 24 also supports a bearing arrangement 28 comprising a vertical spindle, rotatable in bearings, made of an electrical insulator. The disc is in use placed on top of the spindle, active side down, and a clamping cap 29 is applied to hold the centre of the record down on to the top of the spindle and to locate it by means of a spigot extending from the cap through the hole in the record and into the vertical spindle. The transparent electrode of the disc material makes electrical contact with the cap and thence with a conductor which is connected by a slip ring to the virtual earth of a virtual earth amplifier.

The lower end of the spindle carries a metal disc 30 the rim of which is fitted with a rubber tire 31. The disc 30 acts both as a fly wheel and as one member of a friction type reduction gear. The other member of the reduction gear is a plain diameter on the spindle 32 of a drive motor 33 which provides the angular drive for the disc. The motor 33 is pivotally mounted to the transverse wall 24 and is biassed by a spring 34 against the tire 31.

A moiré grating reading head 35 is mounted on a swinging arm 36 pivoted at 37 to the tray 22, in order that it should be moveable between two positions. In its illustrated operating position it co-operates with the radial grating provided by the track 6 of the disc to measure the angular increments of motion of the disc. In its other position, the arm and reading head are clear of the disc to facilitate exchanging one disc for another. A linear grating 38 is mounted to the tray 22 and co-operates with a reading head 39 which is attached to the static framework of the recorder to provide the second scale.

Fixed to the static framework of the machine is an optical system which is not shown in FIG. 3. However, a dotted circle 40 is shown in FIG. 3 and this represents the optical path of the optical system through a supported disc when the tray 22 is in its rightmost postion as shown in FIG. 3.

A second dotted circle 41 illustrates the operating work station position for processing images to retain them on a disc. For this pupose, the recorder is provided with a toner 42 and a fuser 43. Their inoperative positions are shown dotted in FIG. 3. They are movable by means of solenoids to the work station position 41 when required. Also shown dotted in FIG. 3 is the position of a Scorotron 44 which is a grid controlled Scorotron provided for charging the disc. The toner 42 and fuser 43 are attached to the static framework of the recorder whilst the Scorotron is attached to the transverse wall 24 so that it travels therewith.

Figure 4:
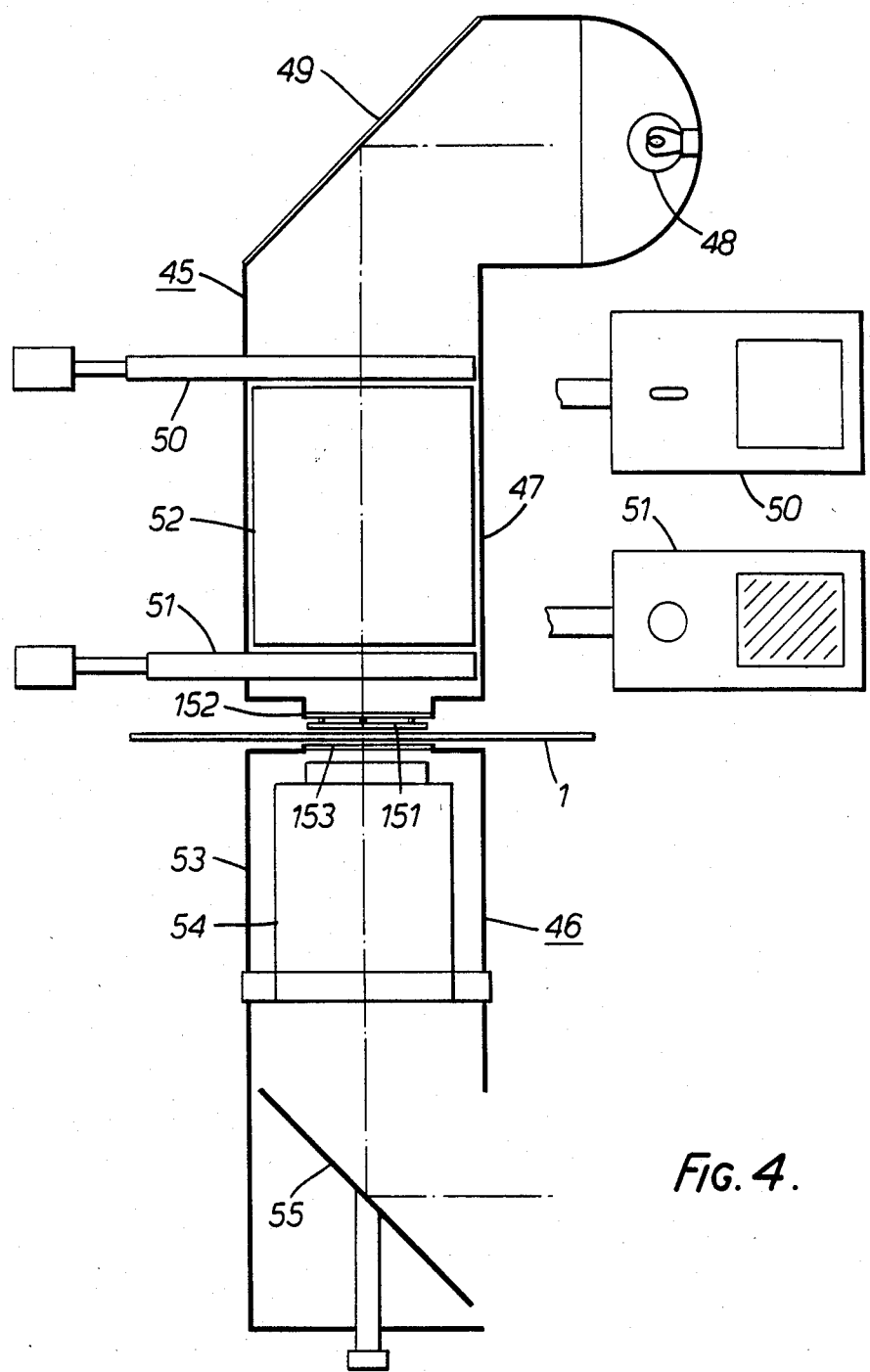
FIG. 4 is a schematic side elevation of part of an optical system for use in the apparatus of FIG. 3.

FIG. 4 shows a side elevation of part of an optical system for use in the apparatus of FIG. 3. The optical system comprises an upper unit 45 positioned above the disc 1 when the apparatus is in use, optically aligned with a lower unit 46 positioned below the disc.

The upper unit 45 illuminates the disc during information retrieval or reading. It comprises a casing 47 holding a lamp 48, in an ellipsidal reflector, and a mirror 49 for reflecting light from the reflector toward the disc. The casing further contains upper and lower adjustable optical filters 50 and 51 placed respectively above and below a four-element lens assembly 52 for providing suitable illumination. The upper filter may be a spatial filter for producing either a light pattern (via a small hole in the filter) suitable for reading of the digital control data track on the disc or a light pattern (via a larger hole in the filter) suitable for reading analogue data contained in the disc. The lower filter may be a filter offering either an infra-red filter (via which the disc is illuminated during reading) or a hot mirror (blanking off the light from above during recording). The lower unit 46 focusses optical information during recording and retrieval. It comprises a casing 53 containing a Gauss lens system 54 and pivotable mirror 55. The Gauss lens system 54 is movable perpendicular to the disc to permit focussing. When the apparatus is used for recording, optical information is projected (by means not shown in FIG. 4) onto the mirror 55 and reflected upwardly through the Gauss lens system which focusses it into the disc. When the apparatus is used for retrieval a page of information on the disc is illuminated by the upper unit 45, and the Gauss lens system 54 and the mirror 55 serve to transmit the information to information display or data reading means (not shown in FIG. 4). The optical system of FIG. 4 also includes air bearings 151 and 153 between the upper optical unit 45 and the disc 1 and the lower optical unit 46 and the disc. These bearings serve to prevent contact between the optical system and the disc. This also serves to purpose, in recording in an electrophotographic system, of preventing electrical discharge of the disc. The bearing shown may be an aerostatic or hydrostatic bearing, in which a fluid is pumped through slots or holes in rings surrounding the periphery of the optical system at faces adjacent to the disc. The fluid pressure maintains a separation between the disc and the optical system.

In the bearing of FIG. 4, the upper bearing comprises an air-bearing ring 151 slidably mounted on pins on a second ring 152, so as to be free to move in a direction perpendicular to the plane of the disc 1. Thus the upper bearing comprises a floating bearing. The lower bearing comprises an air-bearing ring fixedly mounted on the lower optical unit 46.

Such an arrangement allows adjustment of separation between the disc and the lower optical unit 46 by a simple adjustment of pressure in both the bearing ring 151 and the bearing ring 153. Such an adjustment of separation may be used, for example, for fine adjustment of focussing of the optical system.

Figure 5:
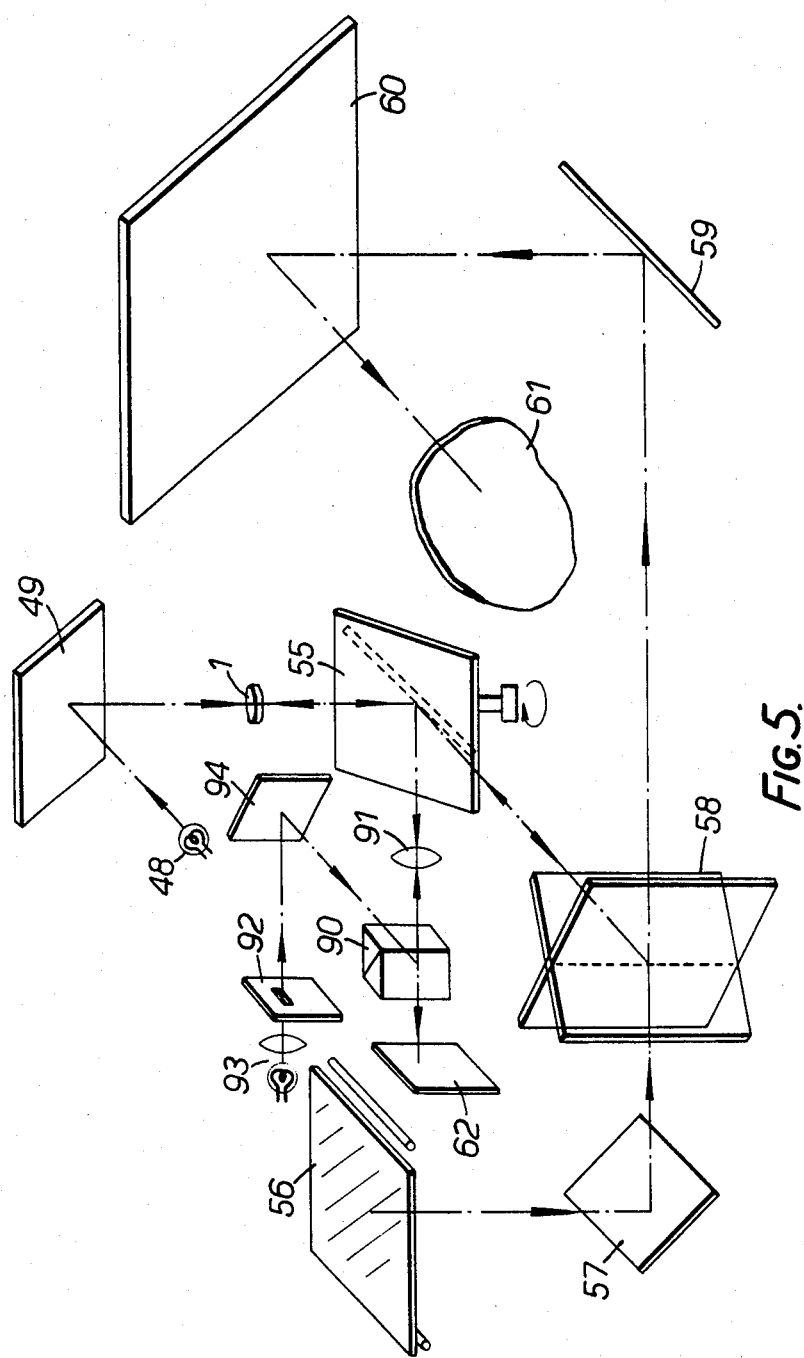
FIG. 5 is a diagram of a possible optical path for use in the recording and display of information using the device of FIG. 3.

FIG. 5 shows optical paths in an optical system for use in the device in FIG. 3, including recording and image display means.

When the system is used for recording analogue pages, the information to be recorded is placed on an illuminated plate 56. Light travelling from the plate is reflected by a mirror 57 onto a movable mirror 58, moved into a first recording position for receiving light from the mirror 57. The mirror 58 reflects the light onto the mirror 55 of the lower unit 46, which transmits the light through the Gauss lens system 54 (not shown in FIG. 5), onto the disc 1 (only a part of which is shown) in FIG. 5.

When the system is used for analogue information retrieval, the lamp 47 of the upper unit 46 transmits light to the mirror 49, which reflects the light through the four lens assembly 52 and the filters 50 and 51 (not shown in FIG. 5), to impinge on the disc.

An image of the illuminated portion of the disc is focussed by the Gauss lens system 54 (not shown), and reflected by the mirror 55 onto the movable mirror 58, moved into a second, retrieving position. The movable mirror 58 reflects the image onto a mirror 59, which in turn reflects in onto a mirror 60. This mirror 60 reflects the image onto a display screen 61, only part of which is shown for the sake of clarity.

it is desirable to ensure in the optical system that there is an odd-number difference between the number of mirrors in the recording system and the number of mirrors in the retrieval system below the disc. This is to avoid image inversion.

For digital reading and recording the mirror 55 is rotated 90° about its vertical axis to a position shown in dotted lines in FIG. 5.

During reading, light reflected from the mirror 55 passes through a lens 91 and a beam splitter 90 and impinges upon a photocell array 62 used for reading of digital information.

For recording digital information, the required bit pattern is produced by a LCD array 92. This array is illuminated by a lens and lamp arrangement 93. The illuminated image of the array is reflected by a mirror 94 into the beam splitter 90. This transmits the light to the mirror 55 by way of the lens 91. The digital image is then focussed on the disc for recording in a manner similar to that used in analogue image recording.

Figure 6:
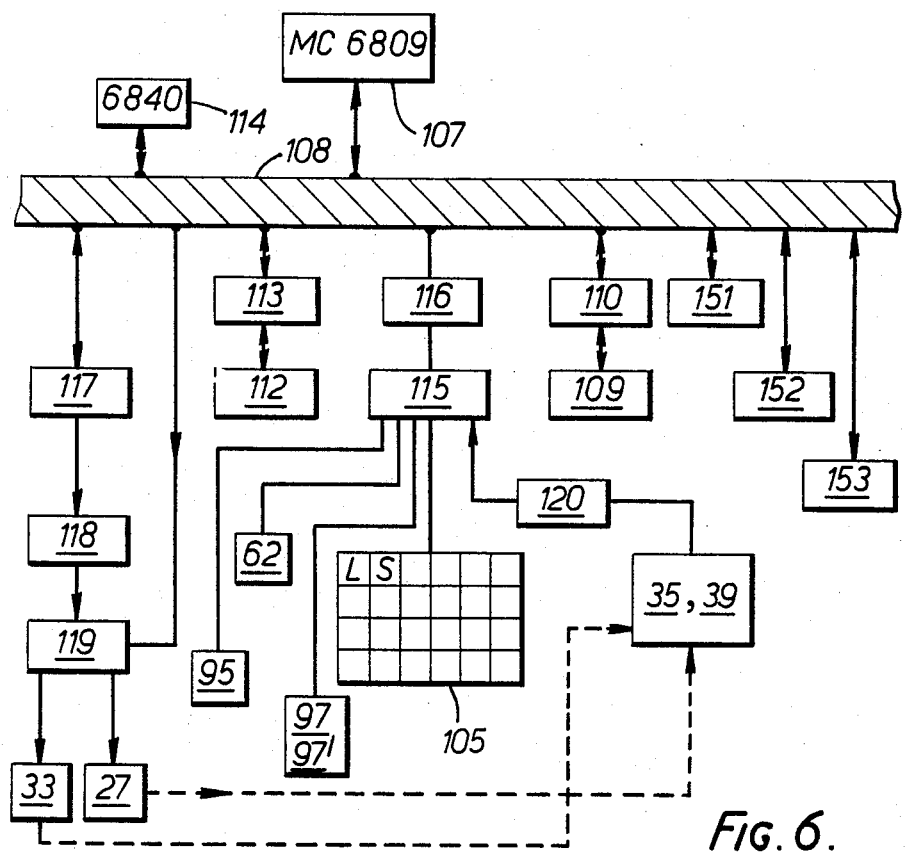
FIG. 6 is a block diagram of a control system for a recording and retrieval apparatus.

FIG. 6 is a schematic circuit diagram of an electronic control system for the apparatus of FIG. 3.

This is based upon an MC6809 microprocessor chip and detailed information on usage can be found, for example, from "An introduction to Mircrocomputers", Volume II, Some Real Products by Adam Osborne and Associates. Motorola data sheets also provide detailed instructions. Accordingly FIG. 6 shows only a schematic circuit diagram.

The microprocessor circuit itself is designated 107 in FIG. 6 and is coupled to a system data bus 108. Also coupled to the data bus, via addressing and interface logic 110, is a read/write memory 109. A read only memory 112 is also coupled to the data bus by way of addressing and interface logic 113. A 6840 timer 114 is also coupled to the data bus for the purpose of timing during serve control. Input/output ports 115 are also provided, being coupled to the data bus by interface logic 116. Coupled to the ports 115 are moire fringe transducers 35 and 39, a keyboard 105, the photocell array 52, and the liquid crystal array 92. The moire fringe transducers are coupled to the ports by an up-down counter 120. Also coupled to the input/output ports are limit switches for detecting the limits of radial travel.

The data bus also communicates with an eight-bit, plus sign bit, digital-to-analogue converter 117 controlling a power amplifier 118 which drives motors 33 and 27 via a multiplexer/changeover switch 119.

Motors 33 and 27 are shown coupled to the moire fringe transducers via dotted lines in FIG. 6, this representing the optical coupling via the co-ordinate scales.

Also coupled to the bus are a fixer drive 151, a toner drive 152, and a Scoratron control 152.

The following description relates to the development of images in the apparatus, using TEP material, requiring toning and fixing.

In order to achieve correct toning, three conditions are ideally met:

(1) the time for which each part of the image is exposed to the toner should be substantially the same;

(2) the flow velocity of toner over the latent image should not be sufficient to produce spurious tribo-electric charge; and (3) the toner application must present a flat equipotential surface in which irregularities are sufficiently small not to cause field distortions in the region of the image.

Figure 7:
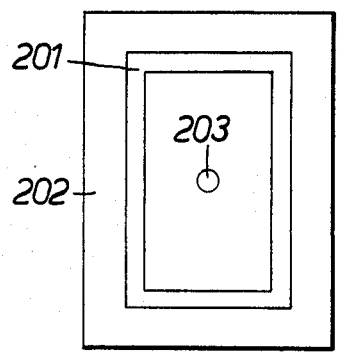
FIGS. 7 and 8 are diagrammatic plan and elevational views, respectively, of a toner applicator forming part of the apparatus of FIG. 3.
Figure 8:
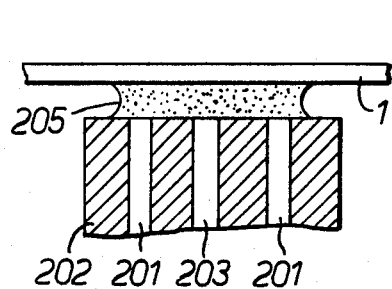

One form of toner applicator which aims to meet these conditions is illustrated in FIGS. 7 and 8. In these drawings, the toner applicator is indicated generally at 202. Toner is applied through a channel 203 and fills the space between applicators 202 and disc 1. Suction is applied through a channel 201 which limits the quantity of toner in the operating space so that it covers an area just sufficient in size (the limit is shown in FIG. 8 at meniscus 205). After a sufficient development time, suction is applied to channel 203, until most of the toner has been withdrawn. Air is then blown through channel 201, sweeping the remainder of the toner towards channel 203. A small drop of toner may remain opposite channel 203, and this small amount of toner may be ignored or steps may be taken to assist its removal. If the drop of toner is ignored, the end result is that, when channel 201 and 203 cease to be active, the droplet will spread into a uniform thin layer which may be thin enough not to degrade the final image. Instead of taking this risk, the droplet of toner may be diluted by the addition of several drops of liquid, for example the liquid component of the toner (e.g. a paraffin) or a volatile liquid which is miscible with the toner. The dilute liquid is then sucked away by applying suction to channel 203, which again is effective except for a small last droplet. Being more dilute than the original droplet, the effect of the remaining diluted droplet is insignificant. Alternatively, a pointed probe may be inserted through channel 203 and made to contact the drop, which will thereby cling to the probe in preference to the surface of disc 1. If desired, this technique may be used after the dilution technique already described.

It is preferred to minimise any turbulence which may occur during the application of toner liquid. An improvement in this respect can be obtained by making the outlet of channel 203 concavely curved, i.e. bell-mouthed.

Figure 9:
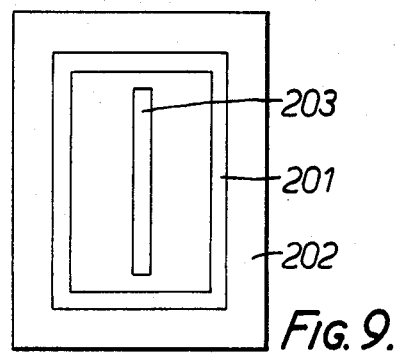
FIGS. 9 and 10 show, in plan view, alternative toner applicators.
Figure 10:
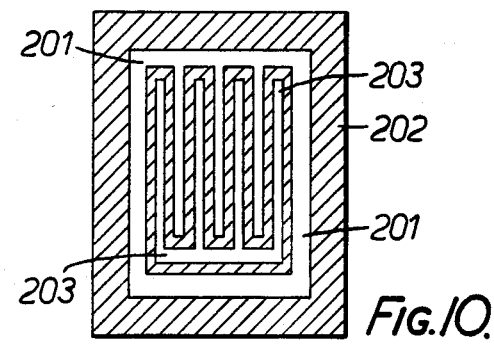

In practice, the time required for development of the image may be of the order of 1 second. In the course of this time, the flow speed of the toner must be restricted to avoid tribo-electric effects. Also, the flow from a single orifice such as the outlet of channel 203 may take a significant fraction of one second in order to fill the operating volume. These limitations may be avoided by modifying the orifice of channel 203 so as to give a distributed arrangement. A wide choice of geometrical arrangements can be used to give a distributed orifice, and the choice depends on the degree of distribution required, the materials involved and the manufacturing technique employed to form the orifice. Suitable configurations are circular holes, and linear or annular slits; these can all be achieved by simple production processes. FIGS. 9 and 10 show two arrangements in which the orifice of channel 3 is extended into a slit-like form. The circumference of the slit is much greater than that of a small circular hole and this results in a reduction in the velocity of toner in the course of its distribution. The slit can also be made narrow compared with the separation between toner applicator and disc, which minimises field distortion.

The arrangement of FIG. 10 shows an interdigitated arrangement which allows very rapid application and extraction of toner. Because of the large linear extent of the outlet slits, their width can be extremely narrow. An interdigitated arrangement of this sort can be used where very high image quality is required, with most faithful rendering of intermediate tones.

Figure 11:
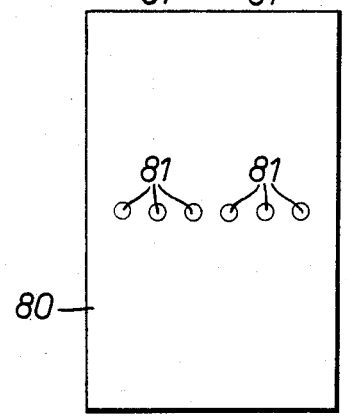
FIGS. 11 and 12 are diagrammatic plan and cross-sectional views of two preferred toner applicators.

The toner applicator of FIG. 11 is particularly suitable for applying toner for use in recording of optical images. The applicator is indicated generally at 80. Toner is applied through a line of transverse circular-section channels 81 and fills the space between the planar upper surface 82 of the applicator and the surface of the disc 1.

These channels have a similar effect to a single transverse slot.

After a sufficient development time (about 1 second) excess toner is sucked out through the same channels 81 through which it was applied. It has been found that this method of removal of toner may be particularly effective.

Figure 12:
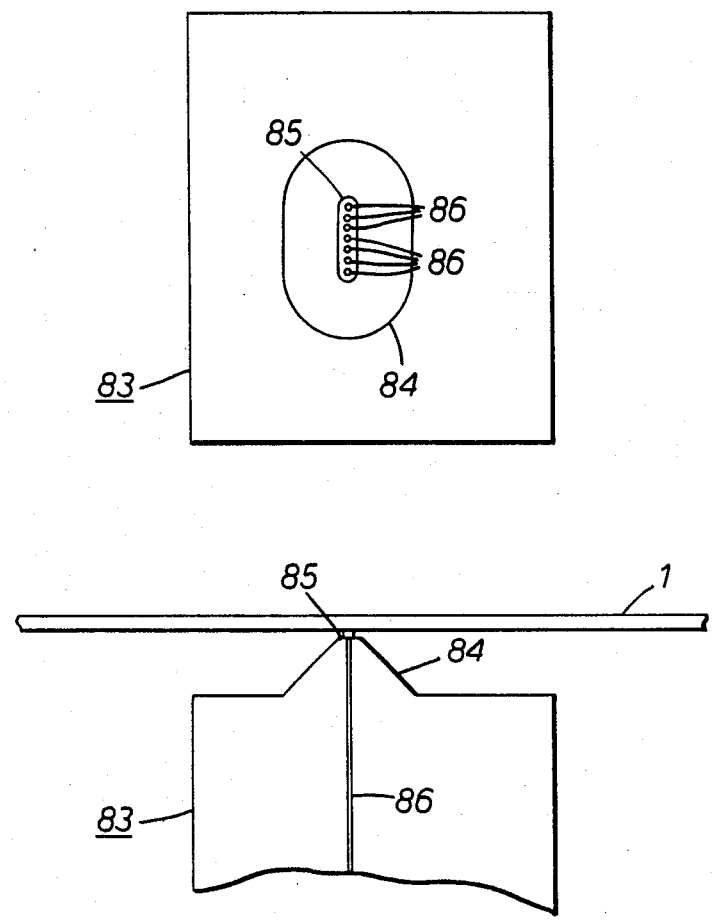

The applicator of FIG. 12, indicated generally at 83, is particularly suitable for applying toner for use in recording digital information. The applicator has a projecting centre section 84 having a small elongate, planar upper face 85. The long axis of the upper face is in a direction tangential to the disc when the applicator is in use.

Toner is applied through a longitudinal line of channels 86 and fills the space between the upper face 85 and the disc. After a sufficient development time, excess toner is sucked out through the channels 86 by which it was applied. The shape and small size of this applicator makes it particularly suitable for use with digital information recording.

The toner applicator moving equipment of FIG. 13 comprises the base 14 having two uprights 65, 66 supporting linear guide rails 67, 68 which are in spaced-apart parallel relationship. On these guide rails is supported a carriage 69. The carriage includes an upright wall 70 to which is attached one end of a solenoid 71. The other end of the solenoid 71 is attached to the upright 66.

Rigid members 72, 73 are pivotally mounted on the carriage. Remote ends of the members are pivotally mounted on the toner applicator 42, so as to provide a parallelogram linkage between the applicator 42 and the carriage. The lower rigid member 73 further includes a free portion 74 extending from the carriage in a direction approximately opposite to that of the work-station, which free portion includes a forked member 75 attached to a lower part of the free portion.

Fixed on the base 14 is a second solenoid 76 the shaft 77 of which is of a diameter such as to be able to pass between the forks of the forked member. A collar is mounted on the upper end of the shaft, which collar has a diameter sufficient to prevent it from passing between the forks of the forked member.

The equipment moves the applicator between an inoperative and an operative position.

The the applicator is in an inoperative position, the equipment is as shown in FIG. 13. The solenoid 71 is in its contracted state, with the carriage 69 to a rightward position (as seen in FIG. 13) and hence with the applicator 42 out of line with the axis of rotation of the disc, indicated by the broken line 78. In this position the forked member is out of engagement with the shaft 77 of the solenoid 76, and hence the applicator is lowered out of proximity with the disc 1.

To move the applicator into its operative position, the solenoid 71 is energised, causing it to move to its expended state, pushing the carriage 69 along the guide rails 67, 68 and aligning the applicator with the axis of the disc. This motion also causes the forked member 75 to engage with the shaft of the solenoid 76. The solenoid 76 is then energised, causing its shaft to move downward. This causes the collar of the shaft to abut against the forked member and move that member also downward. Thus, the applicator 42 is raised into close working proximity with the disc 1.

The operation of the system will now be described.

The memory 112 contains programme data which defines the fundamental operation of the recording apparatus, including defining functions for keys of the keyboard 105. In FIG. 6 two of these keys are designated L and S.

The operator will initially, having applied power to the system and loaded a disc, actuate key S.

On hitting the key S, a starting sequence will be initiated as follows.

Firstly, the disc will be displaced so that the optical path 40 will be at its radially outermost position, detected by a limit switch 97' (FIG. 6). With mirror 55 in its digital data position, motor 27 is operated to move the optical path 40 radially inwardly to detect track 5, specifically so as to locate the extra wide guard rail 9. At this stage, data from the photocell array 62, with decoder, will be received by the microprocessor 107. The width of this array is more than sufficient to encompass the radial width of band 5, so that, within certain limits of eccentricity, the whole width of the band can be imaged onto the photocell array. According to the amount of eccentricity at any particular angle, a different set of photocells will have the image of bit sets 17 imaged upon them. The microprocessor will be able to detect which cells, if any, have the guard rails 9, 10 imaged upon them and from this will determine three factors. Firstly, it will determine whether or not both rails are within the range of the array, and, if not, will adjust the radial position of the disc accordingly via motor 27. Secondly, it will determine the actual value of eccentricity at that given angular position and will store that value in memory 109. Thirdly, it will be able to ascertain which photocells are in a position corresponding to the positions of the twenty bits of a set 17. These particular photocells will be read by the microcomputer to establish the individual bit values. In particular, if it is ascertained that, say, a known group of eight photocells of the array have a position corresponding to a given bit, then, say, the output from the middle four photocells of that set will be averaged to obtain the bit value. This provided an absolute angular position in the angular co-ordinate system. Further angular position measurement can now be effected by way of the moire fringe transducer 35, because this transducer operates on track 6 when the optical path is withdrawn away from the track. Similarly, the position of track 5 (or one of its guard rails 9 and 10) will provide an absolute address for the radical co-ordinate by which the 'zero' of the scale 38 can be determined.

The next step in the process will be for the optical path 40 to be moved under servo control to reach innermost track 4 (or a given one of tracks—defined by detecting the second extra wide band 12) and read the sets of data bits contained therein in a serial manner.

In reaching the data track 4, the reading head will also scan inner guard rails 12. With the aid of the moire fringe transducer 39 and scale 38, the inner and outer guard rails 9 and 12 permit the microprocessor to calculate a fixed radius measurement of the disc and so calibrate the radial measuring system of elements 38 and 39. Such a radius measurement can be established at several known angular positions to measure any disc distortion radial and to store that distortion for address correction, in addition to any eccentricity correction. A first group of characters or words in selected track 4 will be read into the microprocessor system so that the system may ascertain the type of disc, in particular, whether or not any index track is provided, whether or not any programming track is provided and whether or not there is any "title" or "menu" page to be accessed initially. It is pointed out here that one or more tracks 4 may be provided with programme data which defines the manner in which the reader should response to data indexing information, and such programming information will be read into memory 109 for subsequent use during reading of the disc. The memory will also have read into the contents the track or tracks 4 containing indexing information regarding pages already recorded on the disc.

If the data read from the track or tracks 4 defines an initial page to be displayed, then the optical path will be moved radially to the required radial co-ordinate for that page, using the moire fringe transducer 39 to measure radial distance moved. For the present it is noted that when this stage has been reached, the optical system will have been set to image the page to be displayed, the microprocessor system having ceased reading data from the photocell array 62, and will have rotated mirror 55 to enable that page to be displayed by way of the optical system (48, 49, 55 and 58 to 61) shown diagrammatically in FIG. 5. The disc will then be rotated under servo control the angular distance necessary to reach a position corresponding to the known angular co-ordinate of that page. Such radial and angular servo control positioning is under control of the moire reading heads 35 and 39 in conjunction with the motors 27 and 33 and this control will be described in more detail hereinafter. The operator may select further pages by actuating keys on the keyboard.

In one scheme, the individual pages have page numbers running from, say, 1 to 9000 and the operator may input that page number to access the corresponding page. The microprocessor will decode that page number into a corresponding radial co-ordinate value and angular co-ordinate value for page searching in the manner briefly described above.

An alternative method of access is via indexing, and this process will be described hereinafter.

The way in which the servo positioning system operates upon motors 32 and 33 will now be described in more detail.

Firstly it will be apparent that the system must incorporate two servos one for controlling the rotational position of the disc by motor 33 and the other for controlling the radial position of the reading head by motor 27. The only difference between the two servos is the value of the coefficients used by an algorithm within the microprocessor system for calculating motor control voltage. These coefficients will be stored in the memory 112. Motor control data is supplied to the digital-to-analog converter 117 which controls the power amplifier 118 so that it should deliver the desired control voltage with the correct polarity or sign. Radial or angular control is selected by the multiplexer or switch 119.

Because each servo is fundamentally the same, that applicable to controlling angular motion only will be described in detail.

From the information available to the microprocessor, it knows at any one moment the current angular position of the disc and the desired angular position and accordingly knows the distance of angular travel required. If that distance is extremely small, only fine-control is applied, but when that distance is greater than a given value, then the control of position is effected firstly by coarse-control followed by fine-control.

In the coarse-control operation, the timer 114 plays a part in generating an interrupt every 8.9 ms, this time interval being the main sampling period for the servo system. The coarse-control algorithm of the system is in two parts, firstly an acceleration phase in which full motor voltage is applied by the power amplifier, and a deceleration phase in which a deceleration voltage is applied by the power amplifier of such a value as to stop the motor with the disc having reached a "window" around the final target.

Further details of one example of servo control may be found in European Application No. 81300321.7.

It has been indicated above that a digital track or tracks 4 could be provided so as to contain indexing information. Moreover, digital programming information can be stored to provide the apparatus with software particularly adapted to handle the indexing data that is provided on the same disc. In this way a variety of types of indexes can be made compatible with a single embodiment of disc recorder by having the apparatus effectively reprogrammed in part each time a disc is loaded.

For example, a document to be recorded may be assigned only one, or more than one index term. As a further option a menu of index terms may be provided, arranged alphabetically or in a structured manner. In yet a further option the index terms may be predetermined or arranged to be updated at will. As a fifth option, access may be by a word (alphanumeric string) or by a numeric code. A sixth option involves sotring digital index data as a sequential list (in document order, that is document identified follow by index terms) or as an inverted list (index term followed by document identified).

Three possible indexing systems will now be described. The basic differences between the systems are firstly the type of access; whether by word or number code, and secondly the method of storing the data; whether sequentially, in order of documents, or as an inverted list, listed by index term.

A type one system comprises an inverted indexing system with numerical code access. Searching is performed using an optical menu. This system allows a document to be assigned to more than one index. It further permits searching under more than one key. New keys can be added as necessary up to a maximum dictated by the number of datablocks available.

Adding keys, however, requires production of a new optical menu page.

A type two system offers access by word, with an inverted indexing system. It is similar to the type one system, except that it maintains the menu in digital form. When the user types in a keyword, the system searches for it on the digital "menu page", retrieves the address of the datablock associated with it, and then retrieves the addressed of documents listed in that datablock.

A type three system has access by word, but has sequential indexing. The index is digitally recorded. In such a system a document may be assigned to more than one key, and may be searched using more than one key, with Boolean operators. The sequential index permits addition of keys. With such a system, at least some of the digital data must be read into microprocessor memory for filing, and all of it for retrieval. In operation, the user keys in a word, the system searches a list for the word, finds the 16-bit code associated with that word, and then searches for that code in the sequential index.

During recording the keyboard is use by the operator to enter the necessary index data, which is recorded as digital data, as described above, and as determined by a programme contained in the recording apparatus memory and at least part of which may have been retrieved from the disc, as also described above.

A VDU, or simple display, may also be coupled to the processor to guide and inform the user.

We claim:

1. A recording apparatus for recording optically readable images on a storage member comprising recording material by means of which such images can be recorded on the member, the apparatus comprising processing means for recording said images on the storage member, the processing means having imaging means for imaging data to be recorded onto the storage member, and the apparatus also comprising drive means for producing relative motion between the imaging means and the storage member so that an image can be directed at a desired location of the storage member, and control means for controlling the drive means to enable an image to be recorded at any desired one of a plurality of areas of a two-dimensional array of areas in a first zone of the storage member, the control means comprises means for reading co-ordinate defining positional information conveyed by the storage member in a second zone to ascertain a datum position for a first co-ordinate and for a second co-ordinate of a two-dimensional co-ordinate system in which each of said areas has its own two-dimensional co-ordinate address; and said control means comprising measuring means for measuring relative displacements in the two co-ordinate directions to establish co-ordinate addresses relative to the datum positions of the co-ordinates.

2. An apparatus as claimed in claim 1, for use with recording material of a kind with which the imaging means forms a latent image, the apparatus comprising means for rendering said image substantially permanent.

3. An apparatus as claimed in claim 2, for electrophotographic recording material, the rendering means comprising means for electrically charging said material, and means for image toning, and image fixing.

4. An apparatus as claimed in claim 3, and comprising a mechanism, coupled to be controlled by the control means, for moving the toning means and fixing means sequentially to a work station position.

5. An apparatus as claimed in claim 1, wherein the imaging means comprises an optical input path by which a reduced image of a document of legible size can be formed for imaging at the storage member.

6. An apparatus as claimed in claim 1, wherein the measuring means comprises means for measuring displacements in one co-ordinate direction by sensing a positional data on the storage member.

7. An apparatus as claimed in claim 6, wherein the measuring means comprises means for measuring displacements in the other co-ordinate direction by sensing positional data which is part of the apparatus and distinct from the storage member.

8. Apparatus as claimed in claim 1 wherein the processing means includes means for recording digital data on the storage member in addition to the data recorded in the array of areas.

9. Apparatus as claimed in claim 1 and including reading means for reading digital data recorded on the storage member in addition to data in the array of areas.

10. Apparatus as claimed in claim 9, wherein the reading means (62) includes means for producing electrical signals for use by the control means on the basis of digital data read.

11. An apparatus as claimed in claim 1 characterised in that the apparatus comprises means (28,29) for rotatably mounting the storage member.

12. Apparatus as claimed in claim 1, characterised in that the two-dimensional co-ordinate system is a polar-co-ordinate system.

13. A recording apparatus for recording optically readable images on a storage member comprising recording material by means of which such images can be recorded on the member, the apparatus comprising processing means for recording said images on the storage member, the processing means having imaging means for imaging data to be recorded onto the storage member, and the apparatus also comprising drive means for producing relative motion between the imaging means and the storage member so that an image can be directed at a desired location of the storage member, and control means for controlling the drive means to enable an image to be recorded at any desired one of a plurality of areas of a two-dimensional array of areas in a first zone of the storage member, the control means comprises means for reading co-ordinate defining positional information conveyed by the storage member in a second zone distinct from the first zone to ascertain a datum position for a first co-ordinate and for a second co-ordinate of a two-dimensional co-ordinate system in which each of said areas has its own two-dimensional co-ordinate address; and a fluid-pressure operated bearing for preventing contact between the storage member and the imaging means when the apparatus is in use.

14. Apparatus as claimed in claim 13, wherein there are means for selectively adjusting the fluid pressure provided by the bearing to adjust the spatial separation between the imaging means and the storage member and so provide image focussing.

15. A recording apparatus for recording optically readable images on a storage member comprising recording material by means of which such images can be recorded on the member, the apparatus comprising processing means for recording said images on the storage member, the processing means having imaging means for imaging data to be recorded onto the storage member, and the apparatus also comprising drive means for producing relative motion between the imaging means and the storage member so that an image can be directed at a desired location of the storage member, characterized in that there are control means for controlling the drive means to enable an image to be recorded at any desired one of a plurality of areas of a two-dimensional array of areas in a first zone of the storage member, the control means comprises means for reading co-ordinate defining positional information conveyed by the storage member in a second zone distinct from the first zone to ascertain a datum position for a first co-ordinate and a second co-ordinate of a two-dimensional co-ordinate system in which each of said areas has its own two-dimensional co-ordinate address; and said control means including compensation means for compensating for any error between at least one of the two co-ordinates of the storage member and the corresponding co-ordinate as defined by the drive means.

16. Apparatus as claimed in claim 15, wherein the compensation means include means for reading compensation reference data recorded on the storage member.

17. An apparatus as claimed in claim 16, wherein the compensation means comprises means for reading a track extending in one co-ordinate direction to detect any skew that may exist between the measuring means and that co-ordinate direction on the storage member.

18. An apparatus as claimed in claim 16, wherein the compensation means comprises means for reading two elements on the storage member spaced apart in the direction of one of the coordinates to provide a reference length measurement in the direction of that on co-ordinate for use in isotropic scale error compensation.

19. An apparatus as claimed in claim 18, wherein the reading means are arranged to any variations in the spacing of those tracks for use in anisotropic scale error correction.

20. A recording apparatus for recording optically readable images on a storage member comprising recording material by means of which such images can be recorded on the member, the apparatus comprising processing means for recording said images on the storage member, the processing means having imaging means for imaging data to be recorded onto the storage member, and the apparatus also comprising drive means for producing relative motion between the imaging means and the storage member so that an image can be directed at a desired location of the storage member, characterized in that there are control means for controlling the drive means to enable an image to be recorded at any desired one of a plurality of areas of a two-dimensional array of areas in a first zone of the storage member, the control means comprises means for reading positional information conveyed by the storage member in a second zone distinct from the first zone to ascertain a datum position for a first co-ordinate and a second co-ordinate of a two-dimensional co-ordinate system in which each of said areas has its own two-dimensional co-ordinate address; and said apparatus including means for reading indexing information conveyed by the storage member in a zone distinct from the first zone to obtain the two-dimensional address of desired data already recorded in the first zone.

21. A recording apparatus for recording optically readable images on a storage member comprising recording material by means of which such images can be recorded on the member, the apparatus comprising processing means for recording said images on the storage member, the processing means having imaging means for imaging data to be recorded onto the storage member, and the apparatus also comprising drive means for producing relative motion between the imaging means and the storage member so that an image can be directed at a desired location of the storage member, characterized in that there are control means for controlling the drive means to enable an image to be recorded at any desired one of a plurality of areas of a two-dimensional array of areas in a first zone of the storage member, the control means comprises means for reading positional information conveyed by the storage member in a second zone to ascertain a datum position for a first co-ordinate and a second co-ordinate of a two-dimensional co-ordinate system in which each of said areas has its own two-dimensional address; and input means for inputting indexing data to the control means, the apparatus being arranged to record in a zone of the storage member distinct from the first zone the indexing data plus the co-ordinate address of the corresponding recorded area in the first zone.

22. A recording apparatus for recording optically readable multi-bit images on a storage member comprising recording material by means of which such images can be recorded on the member, the apparatus comprising processing means for recording said images on the storage member, the processing means having imaging means for imaging a multi-bit image to be recorded onto the storage member, and the apparatus also comprising drive means for producing relative motion between the imaging means and the storage member so that an image can be directed at a desired location of the storage member, characterized in that there are control means for controlling the drive means to enable an image to be recorded at any desired one of a plurality of areas of a two-dimensional array of areas in a first zone of the storage member, the control means comprises means for reading positional information conveyed by the storage member in a second zone to ascertain a datum position for a first co-ordinate and to a second co-ordinate of a two-dimensional co-ordinate system in which each of said areas has its own two-dimensional co-ordinate address; and said apparatus including optical reading means for optically displaying any desired one of the plurality of areas in the first zone of the storage member.

23. An apparatus as claimed in claim 22 and comprising input means by which the user can enter data for use by the control means in conjunction with said indexing information to determine the address of an area corresponding to the entered data.

24. An apparatus as claimed in claim 23, wherein the control means are operable to determine the address of an area from a defintion, entered at the input means, in the form of a logical combination of names, or codes representing names, of classes of information.

25. A storage member (1) comprising recording material by means of which optically readable images (8) can be recorded and stored by the member, characterised in that the member comprises a first zone (7) at which said recording material is provided and, distinct from the first zone, means which provide a machine readable datum (5,6) for a first co-ordinate and for a second co-ordinate of a two co-ordinate system providing addressing means for each of a plurality of areas of the first zone (7).

26. A storage member as claimed in claim 23, and comprising machine readable digital data recorded in a zone (4) distinct from the first zone (7).

27. A storage member as claimed in claim 24, wherein the digital data comprises addresses of areas of the first zone (7) associated with respective data defining a class of information 28. A storage member as claimed in in claim 23 wherein the recording material is electro-photographic.

29. A storage member as claimed in claim 23 wherein the recording material is photographic.

30. A storage member as claimed in claim 23 wherein the recording material is photochromic.

31. A storage member as claimed in claim 23 wherein the datum means comprises an absolute address zone defining a series of absolute addresses for one co-ordinate and extending in the direction of that co-ordinate and extending in the direction of that co-ordinate.

32. A method of storing information on a disc, which comprises (a) sensitizing a predetermined zone of the disc so that it becomes sensitive to electromagnetic radiation in, or close to, the optical range of wavelengths; (b) focussing onto the said predetermined zone, or a part thereof, a reduced image of the information to be recorded; (c) developing and/or fixing the predetermined zone or said part thereof so as to hold the reduced image in reproducible form within or on the material constituting the predetermined area of said disc; and (d) providing positional address data on the disc in one or more areas separate from said predetermined zone to enable the information recorded at said zone to be retrieved.

33. A recording apparatus for recording optically readable multi-bit images on a storage member comprising recording material by means of which such multi-bit images can be recorded on the member, the apparatus comprising processing means for recording said images on the storage member, the processing means having imaging means for imaging a multi-bit image, in a single imaging step, onto the storage member, and the apparatus also comprising drive means for producing relative motion between the imaging means and the storage member so that a multi-bit image can be directed at a desired location of the storage member and control means for controlling the drive means to enable a multi-bit image to be recorded at any desired one of a plurality of areas of a two-dimensional array of areas in a first zone of the storage member, the control means comprising means for reading co-ordinate defining information conveyed by the storage member in a second zone separate from the first zone to ascertain a datum position for a first co-ordinate and for a second co-ordinate of a two-dimensional co-ordinate system in which each of said areas has its own two-dimensional co-ordinate address, and means for use in measuring relative displacements of the imaging means and storage member in the two co-ordinate directions to establish co-ordinate addresses relative to the datum positions of the co-ordinates.

34. An apparatus as claimed in claim 33 wherein the means for use in measuring relative displacements comprises means for reading positional data on the storage member in at least one co-ordinate direction.

35. An apparatus as claimed in claim 34 wherein the reading means is arranged to read an incremental scale of the storage member in order to measure increments of relative displacement in one of the co-ordinate directions.

36. An apparatus as claimed in claim 35, wherein the reading means comprises means for reading co-ordinate measurement data on the storage member for both co-ordinate directions.

37. An apparatus as claimed in claim 35 comprising measuring means for measuring relative displacements in the other co-ordinate direction by sensing positional data which is part of the apparatus and distinct from the storage member.

38. An apparatus as claimed in claim 33 wherein the control means include compensation means for compensating for an error between at least one of the two co-ordinates of the storage member and the corresponding co-ordinate as defined by the drive means.

39. An apparatus as claimed in claim 34 wherein the compensation means include means for reading compensation reference data recorded on the storage member.

40. An apparatus as claimed in claim 39 wherein the comgensation means comprises means for reading a track extending in one co-ordinate direction to detect any skew that may exist between the measuring means and that co-ordinate direction on the storage member.

41. An apparatus as claimed in claim 39 wherein the compensation means comprises means for reading two elements on the storage member spaced apart in the direction of one of the coordinates to provide a reference length measurement in the direction of that one coordinate for use in isotropic scale error compensation.

42. An apparatus as claimed in claim 41, and comprising the means arranged to respond to any variations in the spacing of said two elements for use in anisotropic scale error correction.

43. An apparatus as claimed in claim 33 wherein the processing means includes means for recording digital data on the storage member in addition to the data recorded in the array of areas.

44. An apparatus as claimed in claim 33 and comprising input means for inputting indexing data to the control means, the apparatus being arranged to record the indexing data plus the address in the first zone of the corresponding recorded area.

45. An apparatus as claimed in claim 44 wherein the apparatus is arranged to record said indexing data in a zone distinct from the first zone.

46. An apparatus as claimed in claim 45 and comprising indexing data as sets of digital bits, each set being imaged as a multi-bit image in one step.

47. An apparatus as claimed in claim 33 wherein the two-dimensional co-ordinate system is a polar co-ordinate system.

48. An apparatus as claimed in claim 33 for use with recording material of a kind with which the imaging means forms a latent image, the apparatus comprising means for rendering said image substantially permanent.

49. An apparatus as claimed in claim 48 for electro-photographic recording material, the rendering means comprising means for electrically charging said material and means for image toning and image fixing.

50. An apparatus as claimed in claim 49 and comprising a mechanism coupled to be controlled by the control means, for moving the toning means and fixing means sequentially to a work station position.

51. An apparatus as claimed in claim 33 wherein the imaging means comprises an optical input path by which a reduced image of a document of legible size can be formed for imaging at the storage member.

52. An apparatus as claimed in claim 33 further including a fluid pressure operated bearing for preventing contact between the storage member and the imaging means when the apparatus is in use.

53. An apparatus as claimed in claim 52 wherein there are means for selectively adjusting the fluid pressure provided by the bearing to adjust the spatial separation between the imaging means and the storage member and so provide image focusing.

54. An apparatus as claimed in claim 53 and including reading means for reading digital data recorded on the storage member separately from the array of areas.

55. An apparatus as claimed in claim 54 wherein the reading means includes means for producing electrical signals for use by the control means on the basis of digital data read.

56. An apparatus as claimed in claim 33 including means for reading indexing information conveyed by the storage member in a zone distinct from the first zone to obtain the two-dimensional address of desired data recorded in the first zone.

57. An apparatus as claimed in claim 56 including optical reading means for optically displaying any desired one of the plurality of areas in the first zone of the storage member.

58. An apparatus as claimed in claim 57 and comprising input means by which the user can enter data for use by the control means in conjunction with said indexing information to determine the address of an area corresponding to the entered data.

59. An apparatus as claimed in claim 58, wherein the control means are operable to determine the address of an area from a definition, entered at the input means, in the form of a logical combination of names, or codes representing names, of classes of information.

60. An apparatus as claimed in claim 33 wherein the apparatus comprises means for rotatably mounting the storage member.

* * * * *